Feb. 2, 1926.
S. J. STRID
1,571,652
FRICTION SHOCK ABSORBING MECHANISM
Filed July 19, 1922 2 Sheets-Sheet 2
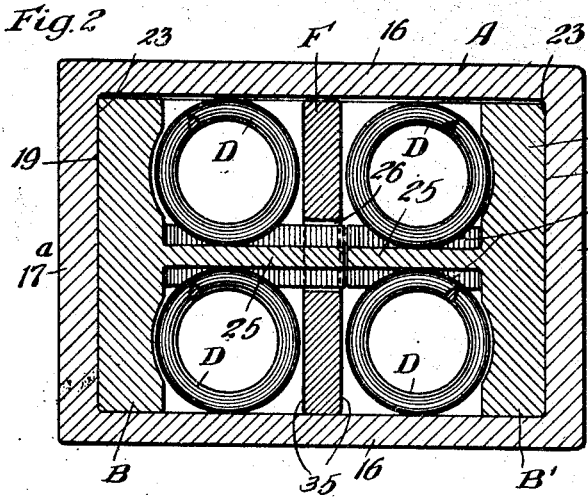
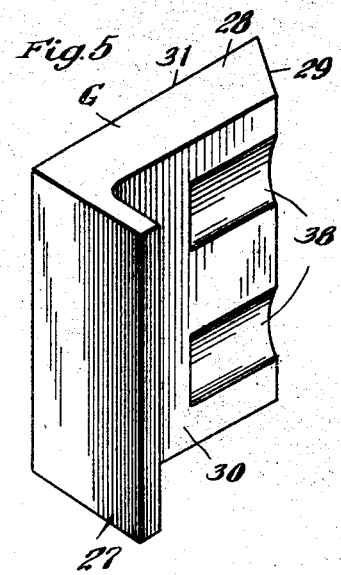
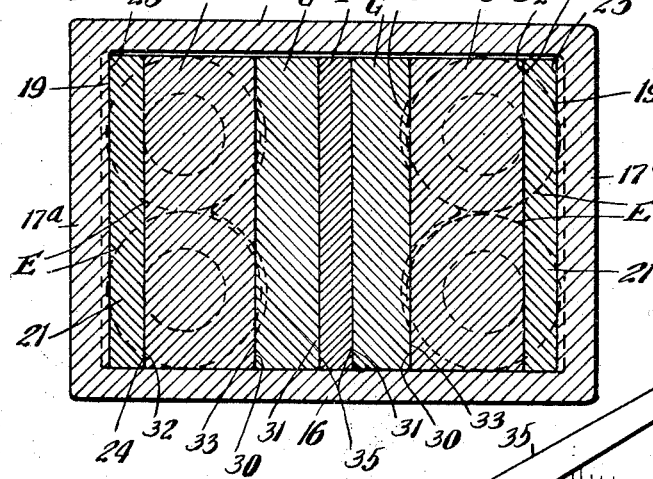
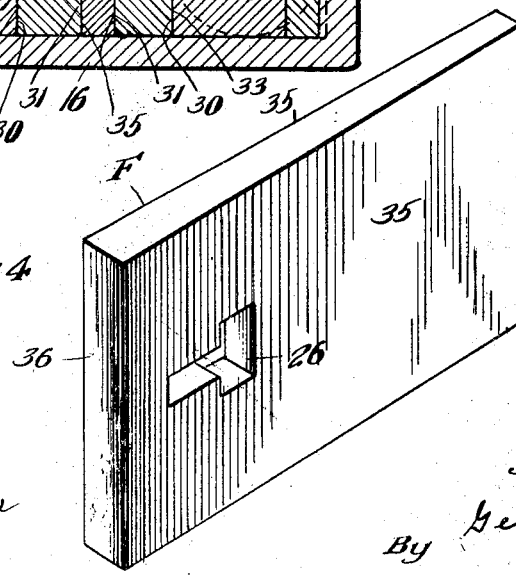
Witnesses
Inventor
Sven J. Strid
By Geo. I. Haight
His Atty Patented Feb. 2, 1926.

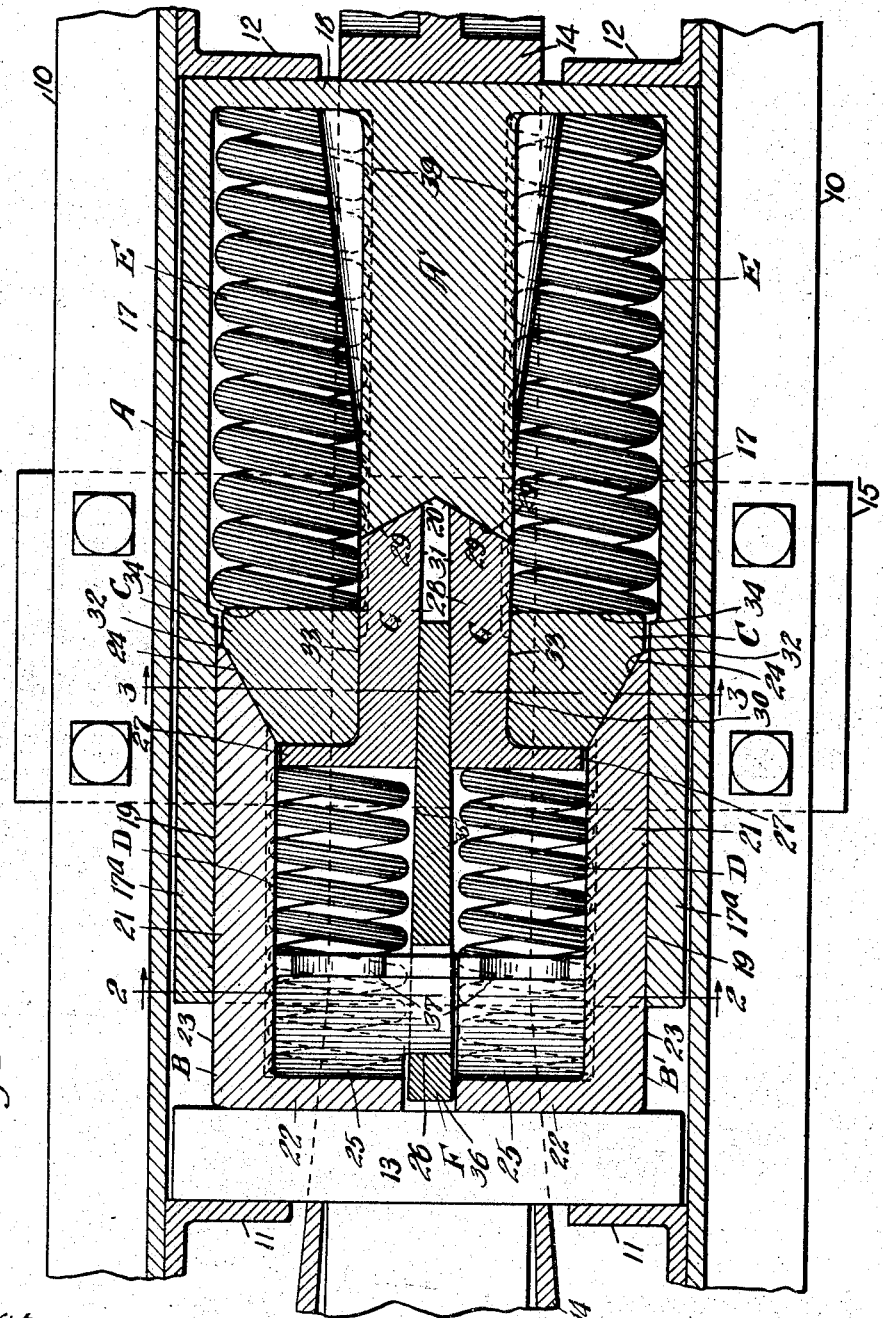

1,571,652

UNITED STATES PATENT OFFICE.

SVEN J. STRID, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 19, 1922. Serial No. 575,981.

*To all whom it may concern:*

Be it known that I, SVEN J. STRID, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism especially adapted for railway draft riggings and wherein are obtained certain release and large friction wearing areas.

A specific object of the invention is to provide a friction shock absorbing mechanism employing a combination of tandem arranged springs with a plurality of sets of friction generating elements.

Another specific object of the invention is to provide a mechanism of the character indicated characterized by a graduated action in compression, combined with an easy and certain release.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Figures 2 and 3 are vertical transverse sectional views of the shock absorbing mechanism proper corresponding to the section lines 2—2 and 3—3 respectively. Figure 4 is a detail perspective of a friction spline employed in my construction. And Figure 5 is a detail perspective of one of the elements composing the friction post employed in my arrangement.

In said drawings, 10—10 denote channel draft sills of a car underframe, to the inner faces of which are secured front stop lugs 11 and rear stop lugs 12. The shock absorbing mechanism proper, hereinafter described, and a front follower 13 are disposed within the yoke 14, which is arranged to be connected to the drawbar in the usual manner. The yoke and parts therewithin are arranged to be supported in operative position by means of a detachable saddle plate 15.

The improved shock absorbing mechanism proper, as shown, comprises, broadly, a combined friction shell and spring cage casting A; a pair of elongated friction shoes B and B'; a pair of wedge-friction-shoes C—C; an outer system of springs D—D; an inner system of springs E—E; a friction plate or spline F; a post A'; and a pair of friction elements G—G which, in conjunction with the post A', constitute a sectional friction post, for the purposes hereinafter described.

The casting A is of rectangular cross section, as shown in Figures 2 and 3, the same having top and bottom walls 16—16, side walls 17—17 and an integral rear wall 18, the latter cooperating with the lugs 12 in the manner of the usual rear follower. The side walls 17, at their outer ends, are thickened as indicated at 17ª—17ª and their inner faces provide longitudinally extending friction surfaces 19—19. The post A' is also made integral with the casting A and extends from the rear wall 18 thereof forwardly in a centrally disposed position. Said post A', at its forward end, which terminates approximately at the center of the casting A, is formed with inwardly converged wedge faces 20—20, for the purpose hereinafter described.

The two friction shoes B and B' are of substantially like construction, each having an elongated leg 21 and an outer right angled flange 22, the latter bearing on the follower 13. Each of the leg sections 21 is formed on the outer side with a longitudinally extending flat friction surface 23 cooperable with the corresponding adjacent friction surface 19 and at its inner end, is wedge-shaped, so as to provide a wedge face 24. Each of the shoes B and B' is further provided with a transversely extending interior rib 25 of T-cross section, one of said ribs 25—the one on the shoe B—being longer than the other and adapted to enter a T-shaped slot 26 provided in the friction spline F. Said T-flange 25 and the slot 26 are so proportioned as to allow a limited amount of longitudinal movement of the shoe B with respect to the friction spline F, as clearly shown in Figure 1.

The two post section elements G—G are of like construction and each is formed with an outer transversely extending flange 27 and an inwardly extended elongated arm 28 having a beveled inner end providing a wedge face 29. Each of said elements G also has outer and inner longitudinally extending friction surfaces 30 and 31 respectively, the same being arranged at relatively acute angles with respect to the axis of the gear. the outer surface 30 diverging rearwardly from and the inner surface 31 converging rearwardly with the axis of the gear.

The two wedge-friction-shoes C are of like construction and each has an outer wedge face 32 cooperable with the corresponding wedge face 24 of the friction shoe B or B'; an inner longitudinally extending friction surface 33; and an inner transverse face 34, the latter providing bearings for the outer ends of the four springs E, which constitute the rear set or spring resistance of the mechanism.

The friction plate or spline F is of rectangular form, as best shown in Figure 4, and has opposed friction surfaces 35—35, the same being converged inwardly of the mechanism at an acute angle and cooperable with the friction surfaces 31 of the elements G. In full release or normal condition of the parts, the outer end 36 of the spline F is slightly spaced from the follower 13 so as to permit the friction shoes B and B' to move inwardly of the shell a slight distance, before the spline F is picked up and actuated.

The front spring resistance also preferably consists of four spring coils D—D, arranged as best shown in Figure 2, in pairs on opposite sides of the spline F, said springs D bearing at their front ends against the inner sides of the flanges 22 of the shoes B and B', and at their rear ends on the laterally extended flanges 27 of the elements G—G.

As shown in Figures 2 and 5, the T-flanges 25 and the outer faces of the elements G are suitably cut away as indicated at 37 and 38 respectively to provide the necessary clearance for the four springs of the front and rear systems respectively. The post A' will be similarly cut away as indicated by the dotted lines 39 in Figure 1, for the same purpose.

The operation of the mechanism is as follows, assuming a compression stroke of the mechanism. As the shoes B and B' are forced inwardly of the friction shell proper, they are resisted primarily by the outer set of springs D and also by the rear set of springs E through the wedge-friction-shoes C. The latter, through the wedge surfaces 32 and 24, press the friction shoes B' outwardly into tight frictional contact with the surfaces of the shell and simultaneously, the elements G—G are pressed inwardly toward the center line of the mechanism, both by reason of the wedge-friction-shoes C and also by reason of the spring pressure exerted thereon by the springs D, which tends to move the elements G longitudinally and consequently toward each other on the sets of wedge surfaces 20 and 29. After the shoes B and B' have moved a predetermined amount, relative to the spline F, the latter is picked up and thereafter actuated simultaneously with the shoes B and B'. Additional friction is thereby added to the resistance of the mechanism, the same being generated between the sets of surfaces 31 and 35. Due to the taper of the spline F, the elements G—G will be gradually slightly separated and, because of said slight separation of the elements G and the outward slope of the friction surfaces 30, the wedge-friction-shoes C will be accelerated longitudinally relatively to the shoes B and B'. From the preceding description, considered in connection with the drawing, it will be noted that I have provided tandem arranged spring resistances combined with frictional resistances and it may also be said that I have designed a twin friction mechanism combined with an extra friction generating member in the form of the spline F and also that the twin friction arrangement has been combined with a tandem arrangement of spring resistances. The entire mechanism produces high capacity, the compression stroke is graduated, the release is easily effected, and the parts compactly arranged. During the release, the shoes B and B' will move outwardly a slight distance before any release movement takes place in the spline F but it will be observed that the T-flange 25 of the shoe B will pick up the spline F and thereby pull it outwardly to its normal full release position.

I have herein shown and described what I now consider the preferred manner of carrying out the invention, but the same is merely illustrative, and I contemplate all such changes and modifications as come within the scope of the claims appended hereto.

I claim:

1. In a friction shock absorbing mechanism, the combination with a friction shell: of tandem arranged spring resistances; and a plurality of friction elements, some of which cooperate directly with the shell and others of which with each other, one said last named elements having coacting friction surfaces disposed longitudinally of the mechanism, and said first named elements having wedge engagement with certain of said last named elements of the tandem arranged spring resistances being disposed within certain of said friction elements.

2. In a friction shock absorbing mechanism, the combination with a friction shell having interior, longitudinally extending friction surfaces; of a plurality of friction shoes cooperating directly with said friction surfaces of the shell; additional friction elements cooperating with said shoes; and tandem arranged spring resistances, one of said spring resistances being confined between said shoes, and another of said spring resistances directly resisting movement of said additional friction elements.

3. In a friction shock absorbing mechanism, the combination with a friction shell; of friction shoes cooperable with said shell; a spring resistance; a friction spline movable with the shoes; and friction-wedge means interposed between said shoes and spline automatically operative to increase the friction generated by said spline upon movement thereof and of said friction shoes.

4. In a friction shock absorbing mechanism, the combination with a friction shell; of friction shoes cooperable with said shell; tandem arranged spring resistances; a friction spline movable with said shoes; and friction-wedge means interposed between each shoe and said spline and together automatically operative to increase the pressure against said spline upon movement of the spline and shoes.

5. In a friction shock absorbing mechanism, the combination with a friction shell; of friction shoes cooperable with said shell; a sectional friction post within the shell; wedge-friction-shoes cooperable with said first named friction shoes and elements of said post; a spring resistance; and an additional longitudinally movable element frictionally cooperable with elements of said post.

6. In a friction shock absorbing mechanism, the combination with a friction shell having a sectional friction post on the interior thereof; of tandem arranged spring resistances; sets of wedge-friction-shoes interposed between and cooperable with the friction surfaces of the shell and said post; and an additional longitudinally movable element frictionally cooperable with elements of said post.

7. In a friction shock absorbing mechanism, the combination with a friction shell; of a friction post disposed within the shell and comprising a plurality of elements; friction shoes cooperable with the shell; wedge-friction-shoes cooperable with said first named shoes and elements of said friction post; a main spring resistance interposed between said wedge-friction-shoes and the shell; a second spring resistance interposed between said first named friction shoes and elements of the friction post; and a longitudinally movable friction element operating between said last named elements of the friction post.

8. In a friction shock absorbing mechanism, the combination with a friction shell; of friction shoes co-operating with said shell; a sectional friction post within the shell; wedge friction shoes co-operable with said first named shoes and elements of said post; a spring resistance; a longitudinally movable spline frictionally co-operable with the elements of said post; and means operatively associated with said spline for retracting the latter upon return of the friction shoes to normal position.

9. In a friction shock absorbing mechanism, the combination with a friction shell having opposed friction surfaces on the interior thereof; of a centrally disposed friction post within said shell, said post including a plurality of elements; twin arranged sets of friction devices interposed between the surfaces of the shell and said post; a spring resistance; and a friction spline movable with said friction elements and frictionally cooperable with elements of said friction post.

10. In a friction shock absorbing mechanism, the combination with a combined friction shell and spring cage casting having an integral centrally disposed post therewithin; of friction post elements mounted on the free end of said post; twin arranged sets of wedge-friction elements cooperable with the shell and said friction post elements; tandem arranged spring resistances; and a friction spline movable with the shoes and operating between said friction post elements.

11. In a friction shock absorbing mechanism, the combination with a combined friction shell and spring cage casting having an integral centrally disposed post therewithin; of friction post elements mounted on the free end of said post; twin arranged sets of wedge-friction elements cooperable with the shell and said friction post elements; tandem arranged spring resistances; and a friction spline movable with the shoes and operating between said friction post elements, one of said spring resistances being disposed outwardly of the end of the friction post and between certain of the friction elements.

12. In a friction shock absorbing mechanism, the combination with a combined friction shell and spring cage casting having an integral centrally disposed post therewithin; of friction post elements mounted on the free end of said post; twin arranged sets of wedge friction elements cooperable with the shell and said friction post elements; tandem arranged spring resistances; a friction spline movable with the shoes and operating between said friction post elements; and co-operable means on said spline and one of the friction shoes for retracting the spline upon release movement of the friction shoes.

In witness that I claim the foregoing I have hereunto subscribed my name this 28th day of June 1922.

SVEN J. STRID.